(No Model.)

A. L. SMITH & E. M. COLE.
TRIAL FRAME FOR OCULISTS AND OPTICIANS.

No. 297,858. Patented Apr. 29, 1884.

Attest.
P. A. Costich
E. N. Adams

Inventors.
A. L. Smith,
E. Merritt Cole,
pr R. F. Osgood,
Atty.

UNITED STATES PATENT OFFICE.

ANDREW L. SMITH AND E. MERRITT COLE, OF GENEVA, NEW YORK.

TRIAL-FRAME FOR OCULISTS AND OPTICIANS.

SPECIFICATION forming part of Letters Patent No. 297,858, dated April 29, 1884.

Application filed March 3, 1884. (No model.)

*To all whom it may concern:*

Be it known that we, ANDREW L. SMITH and E. MERRITT COLE, both of Geneva, Ontario county, New York, have invented a certain new and useful Improvement in Trial-Frames for Oculists and Opticians; and we do hereby declare that the following is a full, clear, and exact description of the same, reference being had to the accompanying drawings, in which—

Figure 1:
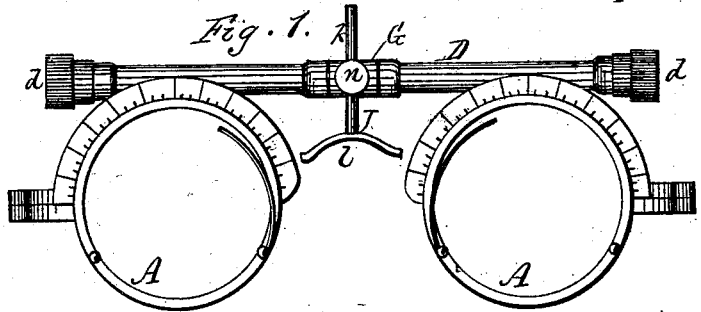
Figure 2:
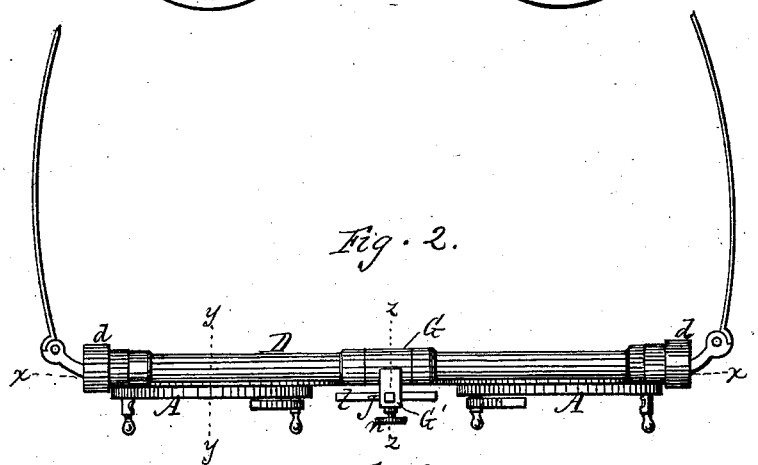
Figure 3:
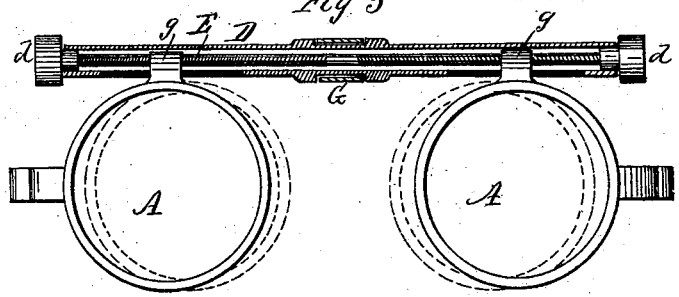
Figure 4:
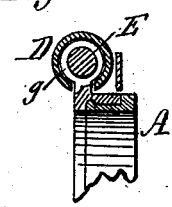
Figure 5:
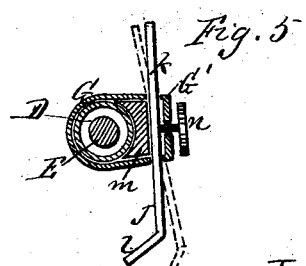

Figure 1 is a front elevation of the device. Fig. 2 is a top edge view of the same. Fig. 3 is a longitudinal sectional view in line $x\ x$ of Fig. 2. Fig. 4 is an enlarged cross-section in line $y\ y$ of Fig. 2. Fig. 5 is a similar view in line $z\ z$ of Fig. 2.

Our improvement relates to devices for testing the eyes, preparatory to fitting spectacles and eyeglasses thereto, and is designed both for oculists' and opticians' use; and it consists in an improved construction and arrangement of parts, whereby not only the lenses can be tested and adapted to the eyes, but also the frame and its connecting parts can be properly adjusted and adapted to the nose and face to present the lenses in proper position before the eyes and give ease to the wearer, all as hereinafter described.

In the drawings, A A show the two eye pieces or sockets, which hold the testing-lenses, said eye-pieces being of any desired form and construction. The testing-lenses are placed in these eye-pieces, and are changed from time to time till those of the proper focal power are found. The instrument is fitted to the face like ordinary spectacles, and the test consists in looking at types or other objects placed at the proper distance from the eyes.

D is a longitudinal hollow case, which may be cylindrical, square, pentagonal, or of any other desired form in cross-section.

E is a long screw resting in the case, extending from end to end, and having finger-pieces $d\ d$ of any suitable kind at the extremities, by which it is turned. At one end the screw has a right-hand thread and at the other a left-hand thread, as shown; but, if desired, the threads may be reversed in position from that shown in the drawings. The eye-pieces A A have lugs $g\ g$, which extend up through a longitudinal slot in the bottom of the case and form nuts, through which the screw passes. It will be seen that when the screw is turned in one direction the eye-pieces will be moved from each other, and when turned in the other direction they will be forced toward each other, as indicated by the full and dotted lines, Fig. 3. This adjustment of the eye-pieces is for the purpose of regulating the lenses and bringing them to the proper pupillary distances of the eyes—that is, bringing them centrally with the eyes in a longitudinal direction.

G is a tubular collar or socket-piece, resting centrally around the case D between two shoulders, and having a free turning movement thereon. G' is an offset or projection of said collar for holding the nose-piece J. The nose-piece consists of a straight shank, $k$, which slides up and down freely in the offset, being square in cross-section or otherwise prepared to prevent turning on its axis, and a bridge, $l$, of the usual form for fitting over the nose. $m$ is a block resting in the offset G between the shank of the nose-piece and the case, being grooved to fit those parts, and $n$ is a set-screw, which passes through the face of the offset and clamps against the shank of the nose-piece to hold it in place. By loosening the set-screw, the nose-piece can be adjusted up and down to adjust the lenses centrally with the eyes vertically, and the collar can also be turned on the case to set the nose-piece forward or back to adjust the lenses toward or from the eyes horizontally. These adjustments are indicated by the full and dotted lines, Fig. 5. When the proper adjustments are attained, the spectacle or eyeglass frames can be fitted after the instrument as a pattern, making a perfect fit to the face, and bringing the lenses of the spectacles or eyeglasses in exact positions with the eyes.

We are aware that instruments for a similar purpose are known, in which a square bar is used in place of the case, and the eye-pieces have square sockets that slide upon the bar; but in such case the longitudinal adjustment of each eye-piece is independent of that of the other eye-piece, and it is difficult to adjust the eye-pieces equally distant from the center. Instruments are also known in which the shank of the nose-piece is adjustable up and down by means of a slot in the shank, through which passes a set-screw; but in such case the nose-piece has no adjustment forward and back. In such cases it is difficult to adjust the lenses properly to the eyes.

By the use of the hollow case and the right-and-left screw, as before described, the longitudinal adjustment of the lenses is made perfect, as both move equally in and out and always retain the same position relative to the center. By making the nose-piece adjustable forward and back as well as vertically, an additional function is obtained—viz., to adjust the lenses toward and from the eyes of the wearer.

Having described our invention, what we claim as new, and desire to secure by Letters Patent, is—

1. The combination of a hollow case forming the frame, a right-and-left screw passing longitudinally through the case, and eye pieces or sockets having lugs forming nuts, through which the screw passes, as set forth.

2. The combination of the hollow case, the collar resting and turning upon the case, the nose-piece passing through the collar, and a set-screw for securing the nose-piece in place, as set forth.

3. The combination of the hollow case, the right-and-left screw passing through the case, the eye-pieces having lugs forming nuts, through which the screw passes, the collar turning on the case, the nose-piece passing through the collar, and the set-screw for securing the nose-piece, as set forth.

In witness whereof we have hereunto signed our names in the presence of two subscribing witnesses.

ANDREW L. SMITH.
    E. MERRITT COLE.

Witnesses:
 FANNIE E. COLE,
 C. S. BURRALL.